United States Patent [19]
Küsters

[11] Patent Number: 5,725,465
[45] Date of Patent: Mar. 10, 1998

[54] METHOD FOR OPERATING A ROLLER AND CORRESPONDING ROLLER

[75] Inventor: Karl-Heinz Küsters, Krefeld, Germany

[73] Assignee: Eduard Kusters Maschinenfabrik GmbH & Co. KG, Krefeld, Germany

[21] Appl. No.: 624,571

[22] PCT Filed: Aug. 12, 1994

[86] PCT No.: PCT/DE94/00929

§ 371 Date: Jun. 24, 1996

§ 102(e) Date: Jun. 24, 1996

[87] PCT Pub. No.: WO95/10660

PCT Pub. Date: Apr. 20, 1995

[30] Foreign Application Priority Data

Oct. 8, 1993 [DE] Germany ............... 43 34 347.3

[51] Int. Cl.[6] .................................................. B23P 15/00
[52] U.S. Cl. ........................................ 492/7; 492/6
[58] Field of Search .................... 492/7, 2, 6, 16;
162/358, 361; 100/162; 72/223

[56] References Cited

U.S. PATENT DOCUMENTS

| | | |
|---|---|---|
| 4,941,247 | 7/1990 | Kubik .................................. 492/7 |
| 5,224,448 | 7/1993 | Niskanen et al. ..................... 492/7 |
| 5,338,279 | 8/1994 | Scheil ................................. 492/7 |

FOREIGN PATENT DOCUMENTS

| | | |
|---|---|---|
| 27 44 524 | 11/1978 | Germany . |
| 34 45 890 | 6/1986 | Germany . |
| 36 25 802 | 2/1988 | Germany . |
| 41 03 799 | 8/1992 | Germany . |
| 2 105 000 | 3/1983 | United Kingdom . |

*Primary Examiner*—Irene Cuda
*Attorney, Agent, or Firm*—Kenyon & Kenyon

[57] ABSTRACT

In a "floating" roller with a fixed cross-beam and a rotating hollow roller, semicylindrical longitudinal chambers are separated and divided off by longitudinal seals and end cross-seals in the space between the crosshead and the hollow roller. At least the longitudinal chamber on the roller nip side can be filled with a compressed gas. The longitudinal seals and the end cross-seals are doubled and are made of closely juxtaposed pairs of sealing strips or. Into the spaces between the sealing strips can be introduced a sealing liquid which seals the longitudinal chambers. Sealing liquid which has penetrated into the longitudinal chambers is continuously removed.

13 Claims, 1 Drawing Sheet

METHOD FOR OPERATING A ROLLER AND CORRESPONDING ROLLER

BACKGROUND OF THE INVENTION

1. Field of the Invention

The present invention relates to a method for operating a roller, and a corresponding roller.

2. Description of the Prior Art

A roller is shown in DE-PS 34 45 890. This known roller is intended for operation with hydraulic oil, i.e., the two longitudinal chambers are filled with hydraulic oil. The longitudinal chamber located on the side of the roller nip has the higher pressure.

SUMMARY OF THE INVENTION

A disadvantage not only of the roller of DE-PS 34 45 890 but also of other deflection equalization rollers, is that at high speeds, they demonstrate a high internal consumption of drive power. Internal consumption of power refers to portions of the drive power which do not go into deformation of the product but instead are used up by the roller itself, i.e. would come about if the roller were rotating without product.

In so-called floating rollers, the power loss due to friction at the longitudinal seals and end cross-seals is comparably slight. The main portion of power loss lies in the losses due to internal fluid friction, which comes about due to the deflection, at the longitudinal seals, of the oil film entrained at the inside circumference of the hollow roller. Particularly at higher speeds, these losses due to fluid friction make up by far the major portion of the power demand.

The present invention is designed in such a way that the internal power losses are reduced.

This task is accomplished, in its method aspects, by the invention as described below according to a preferred embodiment. By using a gaseous pressure medium in the longitudinal chambers, the internal friction which occurs when the pressure medium layer entrained at the inside circumference of the hollow roller is deflected, and the resulting turbulence, are significantly reduced. The gaseous pressure medium, however, sets higher demands with regard to sealing of the longitudinal chambers, which are met by filling the spaces between the longitudinal seals and the end cross-seals with a sealing fluid. In order to make it impossible for the compressed gas to penetrate into these spaces, the pressure of the sealing fluid is higher than the pressure of the compressed gas, i.e., particularly higher than the pressure in the pressure-active longitudinal chamber on the side of the roller nip. Because of this condition, a small portion of the sealing fluid will constantly enter into the longitudinal chambers, going underneath the longitudinal seals and the end cross-seals, on the inside circumference of the hollow roller. If not corrected, this would result in filling the longitudinal chambers with sealing fluid over time. To prevent this from occurring, the penetrating sealing fluid is continuously removed, so that the pure gas filling of the longitudinal chambers is maintained.

The use of compressed gas as a pressure medium is known in deflection-controlled rollers. An example of this type of roller is shown in DE-PS 36 25 801, which shows a rotating hollow roller with a non-rotating cross-beam. The entire space between the cross-beam and the inside circumference of the hollow roller can be filled all around, i.e. without longitudinal seals, with a compressed gas; and zones can be created at individual points, by radial pressure punches, at which the gas pressure does not prevail. In this way, a unilateral force effect comes about. However, since no longitudinal seals are used here, which would seal off longitudinal chambers demonstrating different pressures from one another, the sealing problem does not exist, or does not exist to a comparable degree.

Another example of an air-supported roller is shown in DE-OS 41 03 799, which has a punch-supported deflection-controlled roller as the pressure roller of a film winder. No details of the formation of the air support are described in that patent.

In accordance with an embodiment of the present invention the compressed gas supplied to the pressure-active longitudinal chamber may be tempered, i.e., heated or, particularly, cooled. The latter comes into consideration when the machine is to run at very high speeds. Even a compressed gas heats up, in spite of the lesser internal friction as compared with a hydraulic fluid. This result can shift the desired processing temperature.

BRIEF DESCRIPTION OF THE DRAWINGS

The drawing shows a schematic representation of an exemplary embodiment of the invention.

DETAILED DESCRIPTION OF THE INVENTION

Figure 1:
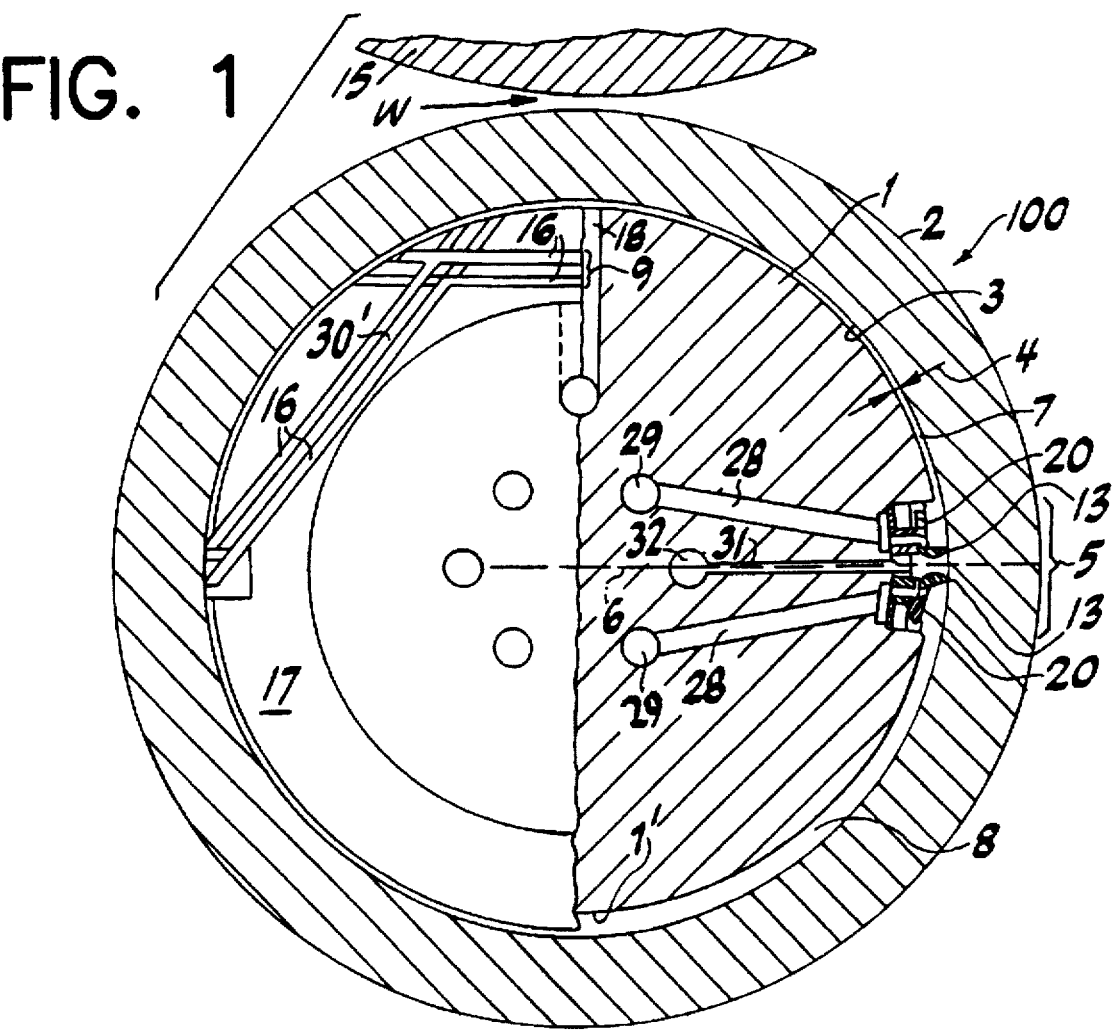
FIG. 1 shows cross-sections through the roller according to the present invention, specifically, in the right half shows inside the roller (seen in its longitudinal direction), in the left half shows the end region, so that the non-rotating carrier for the end cross-seals which is connected to the cross-beam can be seen.

The roller 100 includes a fixed cross-beam 1, around which a hollow roller 2 rotates. The cross-beam 1 leaves a space 4 towards the inside circumference 3 of the hollow roller 2, so that the cross-beam can bend within the hollow roller 2 when a stress occurs in the roller nip W, without touching inside circumferences.

The forces caused by the line pressure in the roller nip W are transferred by the hollow roller 2, via a compressed gas in space 4, to the cross-beam 1. Which deflects under the effect of these forces and in this way generates the counter-forces which bring about equilibrium. In the exemplary embodiment shown in FIG. 1, the counter-roller 15 and the roller nip W are located on the top, so that the cross-beam 1 will deflect downwards. For this reason, the cross-beam 1 is slightly flattened on its bottom 1', in order to create room for this deflection, as can be seen in FIG. 1. The compressed gas is located in a semicylindrical longitudinal chamber 7 formed in the space 4. Chamber 7 is compartmentalized by end cross-seals 9 on an end cross-seal carrier 17 connected with the cross-beam 1. End cross seals 9 delimit the space 4 in the axial direction. Longitudinal seals arranged on both sides of the cross-beam 1, of which the longitudinal seal shown in the drawing, on the right side of FIG. 1, is designated as a whole with 5. A corresponding longitudinal seal is found on the left side, in FIG. 1, of the cross-beam, but is not shown in the left side of FIG. 1. In the exemplary embodiment, the two longitudinal seals 5 lie in a connecting plane 6, which is a perpendicular meridian plane to the plane of effect of the roller, i.e., the plane connecting the axes of the roller 100 and the counter-roller 15.

Because of the end dross-seals 9 and the longitudinal seals 5, two longitudinal chambers 7 and 8 are formed in the exemplary embodiment, of which the longitudinal chamber 7 can be filled with compressed gas via the feed line 18, in this exemplary embodiment, while the longitudinal chamber 8 does not have its own compressed gas feed line.

The longitudinal seal 5 and the end cross-seals 9 in each instance include two individual seal elements 20, 20 and 16, 16, respectively. The longitudinal seal 5 is structured to be symmetrical to the connecting plane 6. Close to the connecting plane 6, on both sides of it and at a slight distance from it, longitudinal recesses 23 with a stepped rectangular cross-section are milled into the circumferential surface of the cross-beam 1. The center plane of recess 23 are inclined slightly towards the connecting plane 6 and form an angle of approximately 5° with the latter. In the broader outer part of the longitudinal recesses 23, support strips 24 with an essentially rectangular cross-section are arranged. Support strips 2 are pressed against the flank of the longitudinal recess 23 which faces the connecting plane 6, by non-round wedging pieces 25. Wedging pieces 25 can rotate around cross-wise axes, and are wedged in place in this manner. On the outer corner of the cross-section, located away from the connecting plane 6, the support elements 24 possess a projection with an undercut 10 which is open towards the connecting plane 6. One of the two seal elements forming the longitudinal seals 5, in the form of sealing strips 20, engages undercut 10 with one of its longitudinal edges 11, from the connecting plane 6 side, for each undercut 10. The sealing strips 20 have an approximately L-shaped cross-section, and the longitudinal edge 11 is formed at the free end of the longer shank of the "L." Opposite the other end of the longer shank of the "L," adjacent to the connecting plane 6 is, the shorter shank which projects almost radially towards the inside circumference 3 of the hollow roller 2. The longitudinal edge 12 of sealing strips 20 which makes contact at roller 2 is formed at the free end of the shorter shank of the "L." The shorter shank is beveled, so that the longitudinal edge 12 forms a wiping edge. The sealing strips 20 are arranged symmetrical to the connecting plane 6, and are held in position and in contact with the inside circumference 3 under spring action by two spring strips 13. Spring strips 13 are wedged in under the support strip 24 and project freely, essentially radially outwardly, and rest against the outside of the shorter shank of the "L" with their free edge.

The sealing strips 20, just like the support strip 24, have cross-wise through-bores 14 and 26, respectively, distributed over their length, and open out into an oil drain space formed behind the support strips 24 by the narrower part 27 of the longitudinal recesses 23. The oil drain space extends over the length of the longitudinal seals 5, and is connected, in each instance, with one or more drain channels 28 distributed over the length. Drain channels 28 run in the cross-wise direction, and in turn lead into a longitudinal bore 29 of the cross-beam 1, through which the sealing fluid can be passed outside the cross-beam 1.

The distance between the wiping longitudinal edges 12 of the sealing strips 20 and the connecting plane 6 is about 5 to 20 mm, in a preferred embodiment.

Between the sealing strips 20, a space 30 is formed, into which the radial bores 31 which run between the longitudinal recesses 23 open out. Bores 31 are supplied with sealing fluid from a longitudinal bore 32.

The sealing strips 20 are made of a suitable bronze alloy, and forms an advantageous slip pairing with the steel of the inside circumference 3 of the hollow roller 2.

The end cross-seals 9 are each formed, in corresponding manner, from two sealing strips 16 which are parallel and spaced at a distance from one another. Sealing strips 16 have a rectangular cross-section, engage in rectangular grooves in the end cross-seal carrier 17 in the axial direction, and rest against a ring disk, (not shown), which rotates with the hollow roller 2, to form a seal. A space 30' after fluid which can be filled with sealing fluid is formed between the sealing strips 16.

In the exemplary embodiment, end cross-seals 9 are provided only for the upper longitudinal chamber 7, which is arranged on the side closest to the counter-roller 15 and supplied with compressed gas via the feed line 18. It is also possible, however, to provide end cross-seals for the lower longitudinal chamber 8, for example if the roller 100 is to operate optionally towards either the top or the bottom.

If the roller is supposed to generate a line pressure in the roller nip W between the roller 100 and the counter-roller 15 which acts towards the top, compressed gas under a corresponding pressure is fed to the longitudinal chamber 7 via the feed line 18. The pressure acts against the inside circumference 3 of the hollow roller 2, in its upper half, and produces a line force directed against the roller nip W. On the other hand, the compressed gas "supports" itself against the top of the cross-beam 1, which deflects downwards under these forces. The pneumatic pressure which prevails in the longitudinal chamber 7 acts on the sealing strip 20 shown in FIG. 1 and 2, if at all, in such a way that it is lifted from the inside circumference 3 of the hollow roller 2. Even if compressed gas also reaches the back of the upper sealing strip 20 via the bores 14 in the longer shank of the "L" and thus a certain pressure equalization takes place, a seal exists because of the contact of the spring strip 30 against the bottom of the shorter shank of the "L". Therefore the active surface of the prevailing pressure in the longitudinal chamber 7 will be greater on the top of the upper sealing strip 20 than on the bottom. It should be noted that the spring strips 13, just like the sealing strips 20, extend over the entire length of the longitudinal chambers 7, 8, without interruption.

Figure 2:
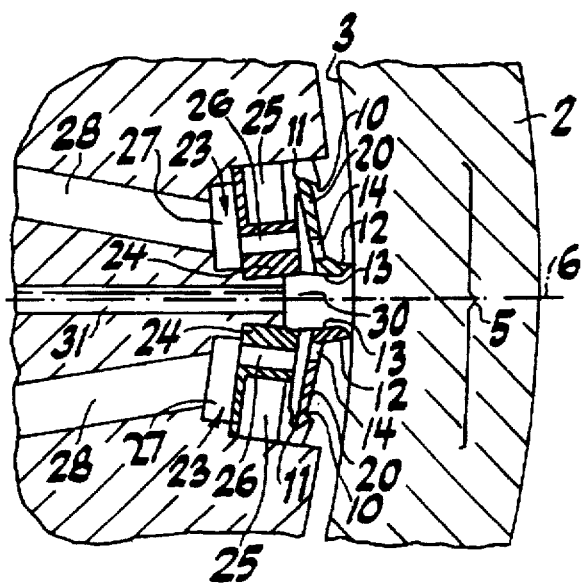
FIG. 2 shows an enlarged partial view from the right half of FIG. 1.

Therefore, if the upper longitudinal chamber 7 is the "pressure-active" longitudinal chamber, the lower sealing strip 20 in FIG. 1 and 2 is the "active" sealing strip. It is necessary to ensure that the higher the pressure in the longitudinal chamber 7, the tighter this sealing strip is pressed against the inside circumference of the hollow roller 2 with its longitudinal edge 12. For this purpose, a pressure is generated in the space 30 between the sealing strips 20, by the sealing fluid, which pressure increases with the pressure in the longitudinal chamber 7 and is greater, in every case, than the pressure in the longitudinal chamber 7. In the arrangement shown, this pressure of the sealing fluid causes the lower sealing strip 20 to tilt around its longitudinal edge 11 in the undercut 10, in the clockwise direction, thereby pressing the lower sealing strip 20 firmly against the inside circumference of the rotating hollow roller 2, which causes the sealing force to be constantly adjusted to the pressure in the longitudinal chamber 7. The pressure of the sealing fluid in the space 30 also benefits the upper sealing strip 20, which provides a pre-seal in this manner. The sealing fluid in the space results in a much greater sealing effect on the sealing strips 20, because of its much greater viscosity in comparison with the compressed gas, so that the arrangement shown will still function even at higher pressures of the compressed gas in the longitudinal chamber 7, without overly high losses of compressed gas occurring.

Because of the adhesion of the sealing fluid to the inside circumference 3 of the hollow roller 2 which passes by the spaces 30, and is conveyed by the higher pressure of the sealing fluid, a certain proportion of sealing fluid is constantly entrained into the longitudinal chambers, going under the sealing strips 20. This would normally result in the longitudinal chambers 7, 8 filling with oil after a certain period of operation, causing high losses of driver power due to internal friction of the fluid. In order to prevent this, the cross-bores 14 and 26, respectively, are provided in the sealing strips 20 and the support strips 24, respectively, leading into the drain channels 28. As the hollow roller 2 rotates, specifically at the sealing strip 20 against which the inside circumference of the hollow roller 2 makes contact, an accumulation of fluid with a certain internal pressure forms there, because the sealing fluid wiped off the inside circumference collects there. As a result the sealing fluid which has gotten into the longitudinal chambers 7, 8 and has been wiped off the sealing strips 20 is constantly driven out through the drain channels 28, so that the longitudinal chambers 7, 8 cannot fill.

The compressed gas which is brought in via the feed line 18 can be passed into a heat exchanger and tempered there before entering into the feed line. This is particularly appropriate if the roller 100 is operated at high speeds and heating of the compressed gas by its internal friction must be counteracted.

I claim:

1. A roller comprising:
   a rotating hollow roller comprising a working roller circumference;
   a non-rotating cross-beam which passes through the hollow roller lengthwise;
   a radial distance between an inside circumference of the hollow roller and an outside circumference of the cross-beam around an entire length of the inside circumference of the hollow roller, thereby forming longitudinal chambers in a space between the hollow roller and the cross-beam;
   a sealing arrangement which compartmentalizes the longitudinal chambers, the sealing arrangement being affixed on the cross-beam, the sealing arrangement comprising end cross-seals provided at opposite ends of the longitudinal chambers, the sealing arrangement further comprising longitudinal seals which extend along a length of the cross-beam on opposite sides of the cross-beam, each longitudinal seal comprising two sealing strips parallel to one another and closely adjacent one another in the circumferential direction, one longitudinal edge of the sealing strips resting against the inside circumference of the hollow roller;
   a gas feed line for a compressed gas, the gas feed line filling at least the longitudinal chamber located on a side of hollow roller nearest the roller nip with compressed gas;
   a fluid feed line for a fluid pressure medium, the fluid feed line filling a space between the sealing strips with a sealing fluid at a pressure that exceeds a pressure of the compressed gas; and
   a fluid removal device for the fluid pressure medium, the fluid removal device removing sealing fluid which has penetrated into the longitudinal chambers from the longitudinal chambers.

2. The roller of claim 1, wherein:
   another longitudinal edge of the sealing strips engages a longitudinal undercut on the cross-beam.

3. The roller of claim 1, wherein:
   the one longitudinal edge of the sealing strips resting against the inside circumference of the hollow roller is slanted.

4. The roller of claim 1, wherein:
   the sealing fluid comprises hydraulic fluid.

5. The roller of claim 1, wherein:
   the fluid removal device comprises drain channels which have an open end which is adjacent the longitudinal seals.

6. The roller of claim 1, further comprising:
   a heat exchanger, the compressed gas passing through the heat exchanger before being introduced into the longitudinal chamber.

7. The roller of claim 1, wherein:
   the end cross-seals comprise two parallel sealing strips.

8. A method for operating a roller comprising:
   providing a rotating hollow roller with a working roller circumference;
   providing a non-rotating cross-beam which passes through the hollow roller lengthwise;
   providing a radial distance between an inside circumference of the hollow roller and an outside circumference of the cross-beam around an entire length of the inside circumference of the hollow roller, thereby forming longitudinal chambers in a space between the hollow roller and the cross-beam;
   compartmentalizing the longitudinal chambers with a sealing arrangement affixed on the cross-beam, the sealing arrangement comprising end cross-seals provided at opposite ends of the longitudinal chambers, the sealing arrangement further comprising longitudinal seals which extend along a length of the cross-beam on opposite sides of the cross-beam, each longitudinal seal comprising two sealing strips parallel to one another and closely adjacent in the circumferential direction, one longitudinal edge of the sealing strips resting against the inside circumference of the hollow roller;
   providing at least the longitudinal chamber located on a side of the cross-beam nearest a roller nip with a feed line for a fluid pressure medium;
   filling at least the longitudinal chamber located on a side of the cross-beam nearest the roller nip with compressed gas;
   filling a space between the sealing strips of each longitudinal seal with a sealing fluid at a pressure that exceeds a pressure of the compressed gas; and
   removing sealing fluid which has penetrated into the longitudinal chambers from the longitudinal chambers.

9. The method of claim 8, wherein:
   the step of compartmentalizing the longitudinal chambers comprises engaging another longitudinal edge of each sealing strip with a longitudinal undercut on the cross-beam.

10. The method of claim 8, wherein:
    the one longitudinal edge of the sealing strips resting against the inside circumference of the hollow roller is slanted.

11. The method of claim 8, wherein:
    the sealing fluid comprises hydraulic fluid.

12. The method of claim 8, further comprising the step of:
    cooling the compressed gas before it is introduced into the longitudinal chamber.

13. The method of claim 8, wherein:
    the step of compartmentalizing the longitudinal chambers comprises providing two parallel sealing strips in each end cross-seal.

* * * * *